United States Patent [19]
Fujii

[11] Patent Number: 5,299,277
[45] Date of Patent: Mar. 29, 1994

[54] FLEXIBLE DISK DRIVE DEVICE
[75] Inventor: Norio Fujii, Kyoto, Japan
[73] Assignee: Rohm Co., Ltd., Kyoto, Japan
[21] Appl. No.: 916,271
[22] Filed: Jul. 21, 1992
[30] Foreign Application Priority Data Jul. 23, 1991 [JP] Japan .................... 3-206303

[51] Int. Cl.$^5$ .............................. H02P 5/168
[52] U.S. Cl. ...................... 388/815; 388/811; 388/910
[58] Field of Search .................... 388/809–815, 388/824, 908, 910, 912; 318/599–603, 606–607

[56] References Cited
U.S. PATENT DOCUMENTS

| | | | |
|---|---|---|---|
| 4,488,096 | 12/1984 | Cap et al. | 318/815 X |
| 4,578,625 | 3/1986 | Nazarian et al. | 388/814 |
| 4,843,288 | 6/1989 | Volz et al. | 318/254 X |
| 4,987,355 | 1/1991 | Leaper et al. | 318/561 |
| 5,159,503 | 10/1992 | Mitamura et al. | 318/625 X |
| 5,193,146 | 3/1993 | Kohno | 318/811 |

Primary Examiner—William M. Shoop, Jr.
Assistant Examiner—David Martin
Attorney, Agent, or Firm—Fay, Sharpe, Beall, Fagan, Minnich & McKee

[57] ABSTRACT

A flexible disk drive device includes an adjusting circuit which sets termination timing of outputting of an index signal in response to the rotating speed of a motor by adjusting charge or discharge time constant of a capacitor; a reference voltage generating circuit which includes a plurality of resistors connected in series between the power source line and the ground line and generates the reference voltage at one of the nodes of the resistor chain; and a reference voltage switching circuit which switches the reference voltage to another reference voltage upon receipt of a speed selection signal which represents a different rotating speed from a predetermined rotating speed, wherein the other reference voltage is so set that the pulse width of the index signal corresponds to a predetermined rotating angle of the motor.

9 Claims, 3 Drawing Sheets

SIGNAL WAVEFORM DIAGRAM
(CORRESPONDING TO FIG.1)

SIGNAL WAVEFORM DIAGRM
(CORRESPONDING TO FIG.4)

FLEXIBLE DISK DRIVE DEVICE

BACKGROUND OF THE INVENTION

1. Field of the Invention

The present invention relates to a flexible disk drive device (hereinafter simply called an FDD), and more specifically relates to an FDD which eliminates adjustment of the pulse width of an index signal which is required when a rotating speed of the FDD is afterward switched to a new rotating speed, such as 300, 360 and 600 rpm.

2. Description of Related Art

FIG. 4 is a view for explaining a three-phase motor control circuit including a conventional index signal generating circuit for an FDD.

The control circuit, which serves as a motor drive control circuit for driving a motor 1 and comprises a sensing circuit 2, an input amplifying circuit 3, a drive signal producing circuit 4 and a drive circuit, further comprises a speed selection circuit 6 and an index signal generating circuit 7.

The motor 1 comprises three coils to which flow drive currents having phases shifted by about 120° each other, whereby the motor 1 is rotated.

The sensing circuit 2 is constituted by three Hall elements as its major components, and senses the rotating phase of the motor 1 and outputs a phase detection signal having a sinusoidal waveform or the like in the form of a voltage signal (a current signal is also acceptable). The respective Hall elements are always kept in an operative condition by a current flowing from a power source line Vcc to the ground line GND via a resistor.

The input amplifying circuit 3 is constituted by three major components differential amplifiers for receiving the respective detection signals. The amplifying circuit 3, amplifies the detection signals and outputs the same to the drive signal producing circuit 4. The drive signal producing circuit 4 receives the three amplified signals from the differential amplifiers, produces three signals based upon the received signals, the phases of which are advanced by e.g. 30° with respect to the respective detection signals and shifted by 120° with respect to each other, and outputs the same to the power drive circuit 5. The power drive circuit 5 is constituted by three power amplifying circuits which outputs drive currents which correspond to the waveforms of the respective drive signals outputted from the drive signal producing circuit 4, and outputs these drive currents to the coils in the motor 1.

In these kinds of motor control circuits, the motor 1, the sensing circuit 2, the input amplifying circuit 3 the drive signal producing circuit 4 and the power drive circuit 5 forms a feedback loop. Namely, the sensing circuit 2 generates the respective detection signals corresponding to the rotating phase of the motor 1 dependent upon the rotating condition of the motor 1, and the three-phase motor 1 is driven in a three-phase full wave by the drive signals having phases advancing by e.g. 30° with respect to the respective corresponding detection signals and having waveforms corresponding to the respective detection signals. In response to the motor drive, the sensing circuit 2 detects detection signals dependent upon the rotating condition of the motor 1, whereby the motor 1 is controlled to rotate at a predetermined constant rotating speed under a steady state condition.

Now, rotating speeds such as 300, 360 and 600 rpm are currently employed for an FDD, therefore motor control circuits for an FDD are designed to allow selection of these rotating speeds from the outside. For this reason, the drive signal producing circuit 4 receives a speed selection signal A, which is set in response to the manipulation from the outside as illustrated in the drawing. When the speed selection signal A is received, the amplitude of the drive signals is varied dependent upon the condition of the selection signal A, and the motor 1 is driven to control the rotating speed to settle at the controlled rotating speed represented by the condition.

Another motor control circuit different from the one explained above is known in which a frequency generating coil (hereinafter simply called an FG coil) is provided at the motor side in order to detect the rotating speed of the motor 1. The detection signals are received by a servo circuit and the servo circuit drives the power drive circuit 5. The servo circuit in place of the drive signal producing circuit 4 further receives the speed selection signal A and varies the amplification rate of the power drive circuit 5 based upon the received signal A to thereby vary the rotating speed of the motor 1.

Still another motor control circuit different from the one explained above is also known in which similar detection signals are received. In response to the received detection signals, rectangular waveform signals are generated, and then a phase error signal is generated by comparing the phase of the generated rectangular waveform signals with a reference. The motor 1 is driven in order that the phase of the detection signals coincides with the reference phase; i.e. the motor 1 is controlled to rotate at a rotating speed corresponding to the reference phase.

In each case switching the switching control of the motor rotating speed is performed in the same manner through the manipulation from the outside. Therefore the operation of the conventional motor control circuit will be explained with reference to the example shown in FIG. 4.

The speed selection circuit 6 is constituted by a switching circuit 6a which permits manipulation from the outside and a selection signal generating circuit 6b. The selection signal generating circuit 6b outputs a speed selection signal A of "1" or high level (hereinafter simply indicated as "H"), or "0" or low level (hereinafter simply indicated as "L") depending upon the set condition of the switching circuit 6a. The speed selection signal A is received by the drive signal producing circuit 4 and the motor drive control circuit performs a control for maintaining the rotating speed of the motor 1 at respective predetermined rotating speeds dependent upon the conditions or the values of the speed selection signal A.

The index signal generating circuit 7 functions to generate an index signal in synchronism with the rotation of the motor and is constituted by such as an externally equipped charging circuit 7a, a flip-flop 7b, a discharging circuit 7c, a comparator 7d, a reference voltage setting circuit 7e and a reference voltage generating circuit 7f. The circuits in the drawing surrounded by dashed lines are constituted by one or a plurality of ICs, and the Hall elements in the sensing circuit 2, the switching circuit 6a and the externally equipped charging circuit 7a constitute so-called externally equipped circuits which are normally arranged outside the IC.

The externally equipped charging circuit 7a serves as a charging circuit for a capacitor C1 and is constituted by a resistor R1, a variable resistor VR and the capacitor C1 connected in series in this order between the power source line Vcc and the ground line GND. The charging circuit 7a adjusts the building-up time of a charging voltage (of which voltage signal is indicated by letter C in the drawing) by selecting the charging time constant with respect to the capacitor C1 through manipulation of the variable resistor VR. The dis which discharges charges in the capacitor C1 and resets the charged voltage to the ground level through the discharging operation.

The reference voltage generating circuit 7f is a resistor type divider circuit constituted by resistors R2 and R3 connected in series in this order between the power source line Vcc and the reference voltage setting circuit 7e, and is grounded via the reference voltage setting circuit 7e. A predetermined reference voltage (which voltage signal is indicated by letter D in the drawing) is generated at the node between the resistors R2 and R3.

The comparator 7d receives the changed voltage signal C and the reference voltage signal D and compares the magnitude of these signal voltages. As a result of the comparison, the comparator 7d outputs a detection signal E at the moment when the charge voltage signal C exceeds the reference voltage signal D.

The flip-flop 7b is set upon receipt of a reference rotary position pulse B (hereinafter called a reference pulse), which is generated in response to a reference rotary point, and is reset when the detection signal E is received. The flip-flop 7b further outputs an index signal F from the Q output terminal. In the present example, one of the signals from the Hall elements in the motor control circuit (in the drawing, the signal amplified by the input amplifying circuit 3 is used) is inputted to a pulse circuit 7g, wherein pulses with a narrow width are generated at the timing representing the reference rotary point in synchronism with, for example, the zero crossing point of a sinusoidal waveform signal or the building-up or falling-down timing of a rectangular waveform signal waveshaped from the sinusoidal waveform signal. Alternatively, these timings and these pulses are used as the reference pulse B. Further, the reference pulse B can be obtained by detecting the rotating condition of the motor 1 separately with a dedicated Hall element or photo sensor, and by converting the detected signal into a pulse form through the pulse circuit 7g.

Hereinafter, the operation for generating the index signal F in the index signal generating circuit 7 is explained with reference to the signal waveform diagram shown in FIG. 3.

Now, assuming that the connection of the switching circuit 6a is selected toward the power source line Vcc through the manipulation from the outside, and the selection signal generating circuit 6b is generating a signal of "H", the drive signal producing circuit 4 receives the speed selection signal A, and the rotating speed of the motor 1 is set at a rotating speed V1. At this instance, the time required to rotate from the reference rotary position through a predetermined rotating angle W with the present speed V1 is assumed as T1, which is determined so as to correspond to the pulse width of the index signal. Herein, the resistance value of the variable resistor VR is adjusted beforehand so that the above corresponding relationship is maintained.

When the reference pulses B are generated in association with the rotation of the motor 1, the flip-flop 7b is set upon receipt of the reference pulse B and the Q terminal is rendered "H", whereby an index signal F of "H" is generated in response to the generation of the reference pulse B. At the same time, the discharge circuit 7c receives an inverted signal *F of the index signal F from the Q output terminal of the flip-flop 7b to prevent discharge of the capacitor C1. Thereby, the externally equipped charging circuit 7a begins charging of the capacitor C1. As a result, the charging voltage signal C builds, up along the solid line Ca (see FIG. 3). The amplitude of the charge voltage signal C exceeds a reference amplitude Da of the reference voltage signal D at the moment when the time T1 determined by the adjustment of the variable resistor VR has passed.

At the moment of the exceeding, the comparator 7d outputs the detection signal E. Upon receipt of the same the flip-flop 7b is reset. Thereby, the index signal F is rendered "L" to terminate the above operation. Then, the charges on the capacitor C1 is discharged via the discharge circuit 7c. In such a way, an index signal F having a pulse width corresponding to the time T1 is outputted from the flip-flop 7b in synchronism with the reference pulse B.

When the connection of the switching circuit 6a is selected toward the ground line side GND, the selection signal generating circuit 6b generates a signal of "L", and with this speed selection signal A the rotating speed of the motor 1 is set at a rotating speed V2 faster than the rotating speed V1. The time required to rotate the same angle of W with the rotating speed V2 is thus assumed as T2, and at this time the resistance value of the variable resistor VR is also adjusted so that the pulse width of the index signal F corresponds to the time T2 (it is assumed herein that such adjustment is already completed).

When the reference pulses B are outputted in association with the rotation of the motor 1, the flip-flop 7b is set upon receipt of the same in the same manner as above. The index signal F is rendered "H" and at the same time, the discharge circuit 7c prevents the discharge of the capacitor C1 upon receipt of the inverted signal *F of the index signal F. Thus the externally equipped charging circuit 7a begins charging and at this time the charge voltage signal C builds-up along the dotted line Cb. Since the pulse width of the index signal is already adjusted to the time T2, the amplitude of the charge voltage signal C exceeds the predetermined amplitude Da of the reference voltage signal D at the moment when the time T2 has passed.

At this moment, the comparator 7d outputs a detection signal E. Upon receipt of the same the flip-flop 7b is reset and the index signal F is rendered "L". As a result, the charge on the capacitor C1 is discharged via the discharge circuit 7c. In such a way, the index signal F having the width T2 is outputted starting in synchronism with the reference pulse B, and both the previous index signal F and the present index signal F are equally generated for the period corresponding to the motor rotating angle W.

As explained above, with the index signal generating circuit in the conventional motor control circuit for an FDD, when the rotating speed of the motor 1 is set at one of different rotating speeds V1 and V2 by the speed selection signal, the resistance value of the variable resistor VR in the externally equipped charge circuit 7a has to be adjusted so that the pulse width of the index signal corresponds to the time period required to rotate through the predetermined angle W in response to the selected rotating speed.

Therefore, when one of a plurality of rotating speeds such as 300, 360 and 600 rpm is required to be selected as a rotating speed for an FDD, readjustment work for setting the pulse width of the index signal which is indispensable in connection with the selection or switching of the rotating speed and an additional line for the readjustment work have been needed.

SUMMARY OF THE INVENTION

The FDD according to the present invention is characterized by being provided with an adjustment circuit which sets a termination time of outputting the index signal in response to the rotating speed of a motor by adjusting charge or discharge time constant of a capacitor, a reference voltage generating circuit which includes a plurality of resistors connected in series between a power source line and the ground line and generates a reference voltage at one juncture of the serially connected resistors and reference voltage switching circuit which switches the reference voltage to another reference voltage when a speed selection signal represents a different rotating speed from a predetermined rotating speed, and further characterized in that the other reference voltage is set so that the pulse width of the index signal corresponds to a predetermined rotation angle of the motor.

According to the FDD of the present invention, when the condition or the amplitude of the speed selection signal from the speed selection signal generating circuit changes, the drive signal producing circuit receives the signal and the rotating speed of the motor is changed by the motor drive control circuit including the drive signal producing circuit in the same manner as the conventional circuit. Other than the above, when the index signal generating circuit for an FDD is constituted as explained above, the reference voltage switching circuit switches the reference voltage upon receipt of the speed selection signal depending upon the condition or amplitude thereof.

For example, assuming that the condition of the reference voltage switching circuit is switched from "ON" to "OFF" or from "OFF" to "ON" depending upon the condition of the speed selection signal, the potential at the juncture between the resistors in the reference voltage generating circuit is switched. Thereby the reference voltage is changed. Namely, the reference voltage is switched in response to a rotating speed determined dependent upon the condition of the speed selection signal to a reference voltage which generates an index signal having a pulse width corresponding to the rotating speed.

More specifically, when the reference voltage generating circuit is constituted by a resistor-type divider circuit and a comparing circuit for comparing the terminal voltage of an externally equipped capacitor with the reference voltage, the reference voltage can be determined dependent upon the ratio of the resistance values of the resistor in the resistor type divider circuit, and the detection signal generation timing from the comparing circuit is determined, which determines the termination timing of the index signal. In order words, through the setting of the ratio of the resistance values of the resistors in the reference voltage generating circuit, the termination timing of the index signal corresponding to the rotating speed can be determined. Thereby, the width of the index signal can be set.

Accordingly, the resistance ratio of the respective resistors in the divider circuit is set so that an index signal has a pulse width corresponding to the rotating speed, which is selected dependent upon the condition or the amplitude of the speed selection signal. With the circuit thus constituted, it is possible to automatically match the width of the index signal with the predetermined rotation angle W of the motor simply by changing the condition or amplitude of the speed selection signal dependent upon the desired rotating speed, without necessitating the manipulation of the variable element in the externally equipped charging circuit.

The selection of the resistance ratio in the resistors is performed via the reference voltage switching circuit dependent upon the condition of the speed selection signal. Further, since the pulse width of the index signal is determined dependent upon switching of the resistance ratio, it is necessary to set a correct relationship between the pulse width of the index signal and the rotating speed of the motor at the inital stage. Accordingly, the relationship is adjusted by the adjusting circuit so that an index signal having a correct pulse width is generated when a certain rotating speed of the motor is set for the first time.

Namely, according to the FDD of the present invention, with a one-time, adjustment via the externally equipped charging circuit during assembly of the circuit, the pulse width of the index signal can match a new rotating speed of the motor selected by the speed selection signal without necessitating readjustment of the circuit.

As a result, it is satisfactory if one kind of adjustment line and the jig therefor appropriate for a certain rotating speed is prepared, and thereby reduction of the production facility, production cost and the man hours for the adjustment work are realized and an FDD of excellent productivity is provided.

Accordingly, an object of the present invention is to provide an FDD which requires an adjustment of the pulse width of an index signal corresponding to one rotating speed and eliminates readjustment of the pulse width of the index signal when other rotating speeds are selected.

Another object of the present invention is to provide an FDD such that once the FDD whose index signal pulse width is adjusted for one rotating speed is produced, other rotating speeds can be used with only the manipulation of a switch.

A further object of the present invention is to enable FDDs having different rotating speeds to be produced on the same production line.

DESCRIPTION THE PREFERRED EMBODIMENT

Figure 1:
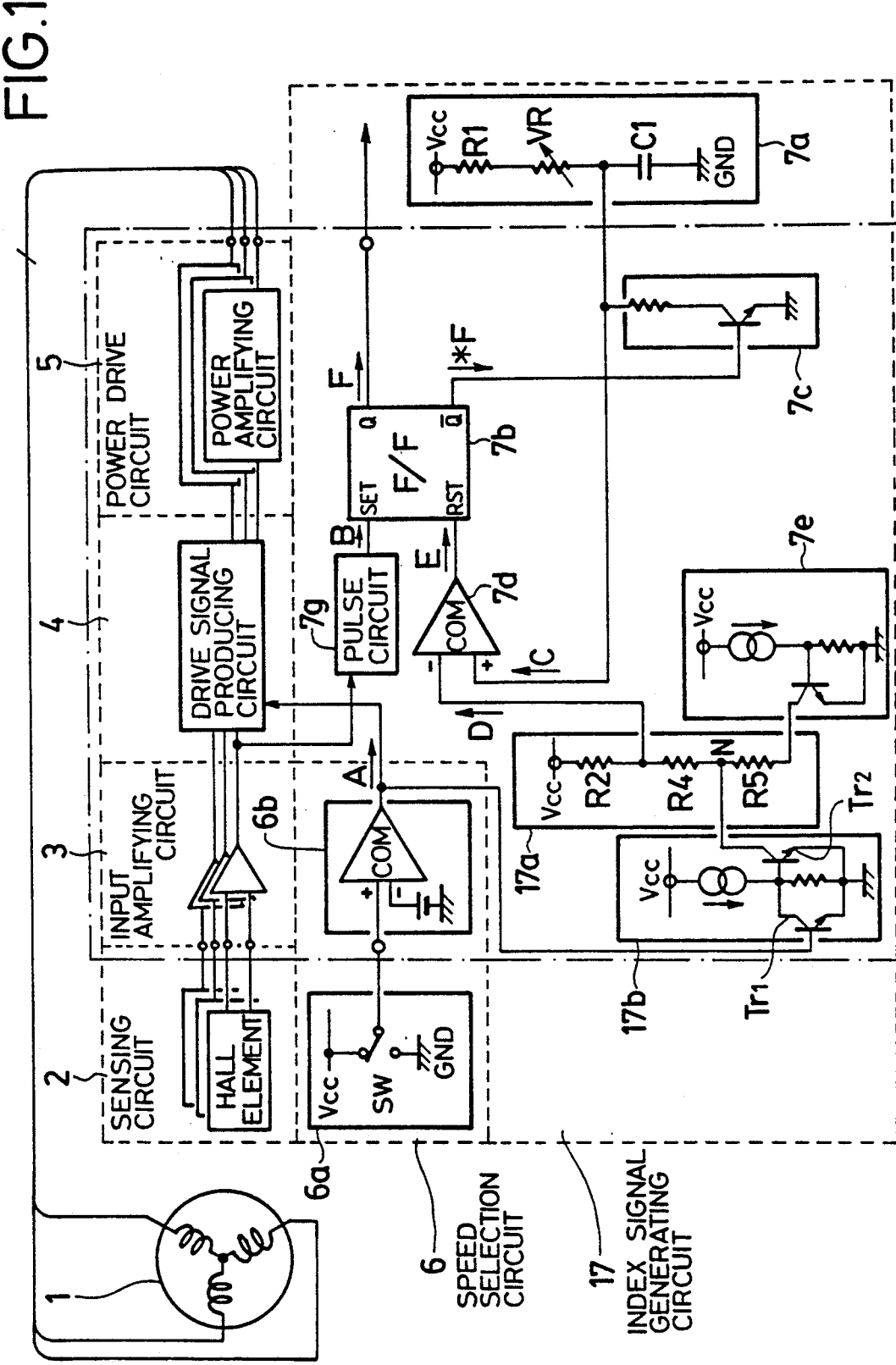
FIG. 1 is a view for explaining one embodiment of a three phase motor drive control circuit for an FDD, and in particular, an index signal generating circuit according to the present invention.
Figure 4:
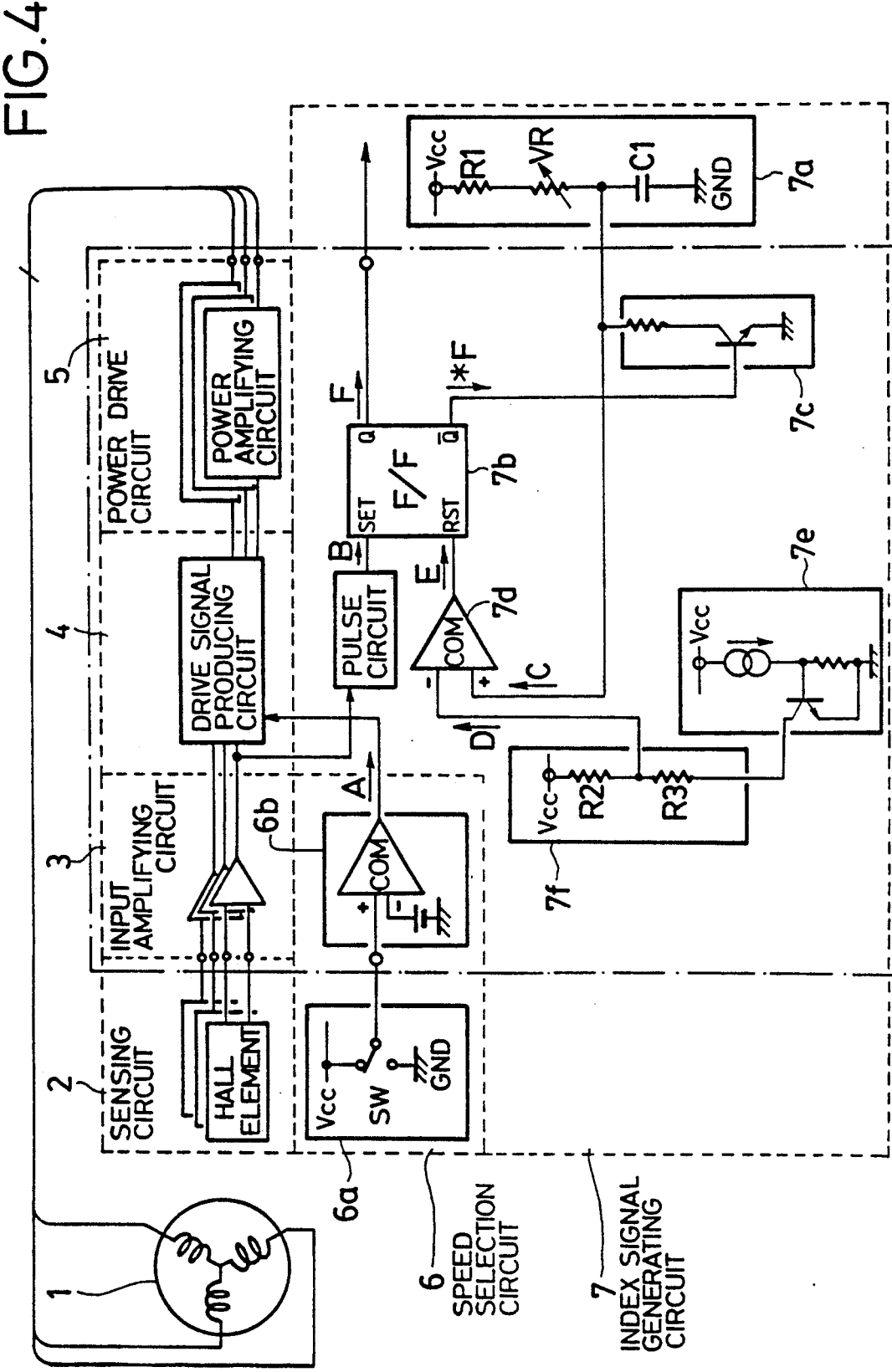
FIG. 4 is a view for explaining the conventional three-phase motor drive control circuit for an FDD, and in particular, an index signal generating circuit.

The difference of the present embodiment from the circuit as shown in FIG. 4 is that an index signal generating circuit 17 is provided in place of the index signal generating circuit 7. Since the other portion for the preferred motor control circuit is substantially the same as that explained in connection with FIG. 4, the explanation thereof is omitted. Further, the circuit elements in FIG. 1 that are represented by the same symbols as circuit in elements in FIG. 4 indicate the same elements as those shown and in FIG. 4, therefore the explanation thereof is also omitted.

The index signal generating circuit 17 includes a reference voltage generating circuit 17a which is a substitute for the reference voltage generating circuit 7f in the index signal generating circuit 7 of FIG. 4. Further, a reference voltage switching circuit 17b is included.

The reference voltage generating circuit 17a is a divider circuit which is constituted by resistors R2, R4 and R5 connected in series in this order between the power source line Vcc and the reference voltage setting circuit 7e and is grounded via the reference voltage setting circuit 7e. Further, the node N between the resistors R4 and R5 is connected to the reference voltage switching circuit 17b.

The reference voltage switching circuit 17b in the present embodiment is a switching circuit which is constituted by NPN type transistors Tr1 and Tr2 as its major components. The speed selection signal A is applied to the base of the transistor Tr1. Further, depending upon the state of the speed selection signal A, the transistors Tr1 and Tr2 are turned ON/OFF. Through the turn ON/OFF of the transistors, the node N is connected or disconnected to the ground line GND.

For the sake of easy understanding, in the following explanation the sum of resistance value, of the resistors R4 and R5 is assumed to be set equal to the resistance value of the resistor R3 in FIG. 4. The reference voltage switching circuit 17b turns "ON" the transistor Tr1 and turns "OFF" the transistor Tr2 upon receipt of the speed selection signal A of "H" and is thus disconnected from the node N. Accordingly, at this instance, the index signal generating circuit 17 operates in the same manner as the index signal generating circuit 7 as shown in FIG. 4.

Figure 2:
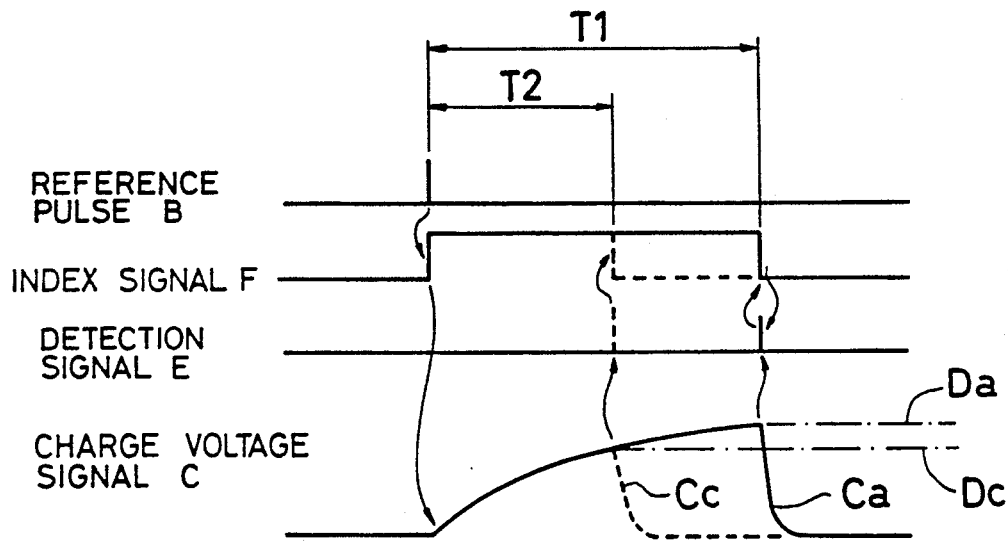
FIG. 2 shows waveform diagrams for respective portions of the index signal generating circuit as shown FIG. 1.
Figure 3:
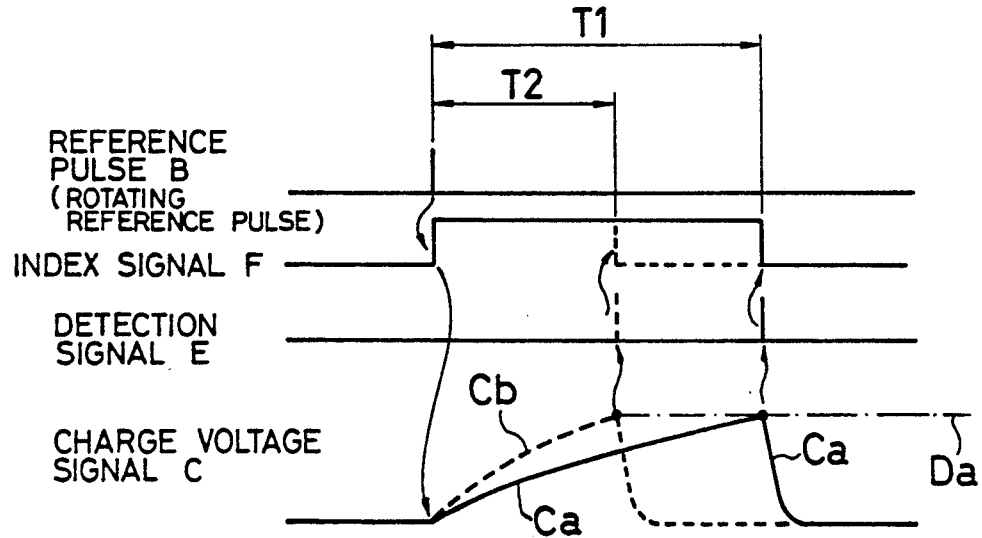
FIG. 3 shows waveform diagrams for respective portions of a conventional index signal generating circuit as shown in FIG. 4.

On the other hand, when the reference voltage switching circuit 17 receives a speed selection signal A of "L", the transistor Tr1 turns "OFF" and the transistor Tr2 turns "ON". Thereby the node N is grounded. At this moment, the potential (reference potential) at the node between the resistors R2 and R4 drops from a potential Da to a potential Dc as illustrated in FIG. 2, and given the potential drops as explained, the respective resistance values of the resistors R4 and R5 are selected so that the sum thereof becomes equal to the resistance value of the resistor R2.

The operation of the index signal generating circuit 17 thus constituted is explained with reference to the signal waveform diagrams shown in FIG. 2.

Like the above explanation, assuming that the connection of the switching circuit 6a is selected toward the power source line Vcc side through manipulation from the outside, the selection signal generating circuit 6b generates a signal "H". Thereby, a speed selection signal A of "H" is generated to set the rotating speed of the motor 1 at a rotating speed V1. Further, it is assumed that the time required to rotate through the predetermined angle W with the rotating speed V1 is T1. Also like the previous explanation, the resistance value of the variable resistor VR is beforehand adjusted so that the pulse width of the index signal corresponds to the time T1 in connection with the rotating speed V1.

When the reference pulse B is outputted in association with rotation of the motor 1, the flip-flop 7b is set upon receipt of the same and the index signal F is rendered "H". At the same time, the discharge circuit 7c terminates discharging upon receipt of an inverted signal *F of the index signal F. Then the externally equipped charge circuit 7a starts charging, the charge voltage signal C builds up along the solid line Ca, and at the moment when the time T1 has passed, the value of the charge voltage signal C exceeds a set voltage value Da of the reference voltage signal D. As a result, a detection signal E is outputted from the comparator 7d. Upon receipt of the same, the flip-flop 7b is reset and the index signal F is rendered "L". An index signal F having the pulse width corresponding to the time T1 which starts in synchronism with the reference pulse B is outputted in the same manner as in FIG. 4.

On the other hand, when the connection of the switching circuit 6a is selected to the ground line side GND through manipulation from the outside, the selection signal generating circuit 6b generates a signal "L". Thereby, a speed selection signal A of "L" is generated to set the rotating speed of the motor 1 at a different rotating speed V2. In the same manner, it is assumed that the time required to rotate through the predetermined angle W with the rotating speed V2 is T2.

When, in association with the rotation of motor 1, a reference pulse B is outputted, the flip-flop 7b is set upon receipt of the same and the index signal F is rendered "H". At the same time, the discharge circuit 7c terminates discharging upon receipt of an inverted signal *F of the index signal F. When the charge voltage signal C builds up along the solid line Ca and at the moment when the time T2 has passed, the value of the charge voltage signal C exceeds a set voltage value Dc of the reference voltage signal D. The reference voltage switching circuit 17b which has received the speed selection signal A of "L" changes the value of the reference voltage signal D to the set value Dc, and thereby at this moment a detection signal E is outputted from the comparator 7d. With respect to the rotating speed V2, no adjustment of the resistance value of the variable resistor VR is needed, so that the pulse width of the index signal corresponds to the time T2. Upon receipt of the detection signal E, the flip-flop 7b is reset and the index signal F is rendered "L". As a result, the index signal F having the width T2 which starts in synchronism with the reference pulse B is outputted.

In the index signal generating circuit 17 thus constituted, a resistor-type divider circuit constitutes the reference voltage generating circuit 17a. The accuracy of voltage generated by the circuit does not depend on the absolute resistance values of the respective resistors R2, R4 and R5, but depends upon the ratios of their resistance values. Therefore, as long as the initial setting of the rotating speed of the motor is correctly performed through the setting of the resistance value of the variable resistor VR in the charge circuit, the voltage switching at the ratio corresponding to the rotating speeds is correctly performed only through switching of the reference voltage switching circuit 17b so as to correspond to the rotating speed after switching. Therefore the adjustment which was required for the conventional circuit is eliminated.

Further, the reference voltage switching circuit 17 can be easily formed as an IC. Still further, the reference voltage switching circuit 17 can be formed as an IC together with the speed selection circuit 6 and other circuits such as the input amplifying circuit 3 and the drive signal producing circuit 4 while maintaining full compatibility with the conventional IC with respect to pin arrangement.

Accordingly, only when one width of the index signal is set on a common production line by adjusting the resistance value of the variable resistor VR in the charge circuit with respect to a predetermined rotating speed, no further adjustment of the resistance value of the variable resistor VR is needed for setting another width of the index signal corresponding to another rotating speed.

In the above embodiment, the switching between two rotating speeds with the resistor-type divider circuit of the reference voltage generating circuit 17a constituted by three resistors R2, R4 and R5 was explained. However, another number of resistors for the resistor-type divider circuit of the reference voltage generating circuit 17 can be selected. Further, when one of a plurality of rotating speeds such as 300, 360 and 600 rpm is to be selected, it is possible to generate a multiplicity of reference signals for selecting a multiplicity of rotating speeds by constituting a divider circuit through combination of a multiplicity of resistors. Still further, when such switching between more than three rotating speeds is required, it is possible to increase the bit number of the speed selection signal and to provide a plurality of reference voltage switching circuits corresponding to the numeral values or the number of conditions represented by the speed selection signal.

As a result, through the production of FDDs for a predetermined rotating speed on a common production line, other FDDs for another rotating speed specification can be produced only by switching the switch afterward without modifying the specification. An adjustment of the pulse width of the index signal only once at the first stage is satisfactory and no further adjustment is needed so that the productivity of the FDD is improved.

Further, in the conventional charge circuit 7a, a variable resistor VR having a broad adjustment range was used for enabling adjustment for a plurality of rotating speeds to be selected. However, according to the present invention it is satisfactory if the adjustment range of the variable resistor VR is sufficient for selecting a pulse width of the index signal corresponding to a predetermined rotating speed to thereby narrow the adjustment range thereof. As a result, a low-cost variable resistor in comparison with the conventional one can be used, and further a broad adjustment range can be used for the specific rotating speed to thereby facilitate the adjustment work.

In the present embodiment, the resistor-type divider circuit is disposed between the power source line and the ground line; however, the divider circuit may be disposed between a first bias voltage line (or potential line) and a second bias voltage line (or potential line).

Further, in the present embodiment, the charge voltage at the externally equipped capacitor is compared with the reference voltage; however, the charging and discharging relationship in the capacitor may be inverted, in that the capacitor is maintained in a charged condition beforehand, then discharge of the capacitor is initiated upon receipt of the reference pulse B and the charge voltage of the capacitor is compared with the reference voltage to determine the termination of the index signal.

I claim:

1. A flexible disk drive device which maintains a motor at a predetermined rotating speed in response to a speed selection signal and generates an index signal in synchronism with the rotation of the motor, comprising:
    means for producing a signal representing a reference rotary position of the motor;
    an index signal producing circuit which receives the signal representing the reference rotary position of the motor, initiates outputting of the index signal upon receipt of the signal representing the reference rotary position of the motor, and terminates the outputting of the index signal by comparing a terminal voltage of a capacitor of the index signal producing circuit with a predetermined reference voltage;
    an adjusting circuit which sets the termination timing of the outputting of the index signal by adjusting the charge or discharge time constant of the capacitor;
    a reference voltage generating circuit which includes a plurality of resistors connected in series between a first line which is a voltage source line and a second line having a lower voltage than the voltage source line, and generates a reference voltage from a node between adjacent resistors in the series; and
    a reference voltage switching circuit which changes the reference voltage upon receipt of a speed selection signal representing a different rotating speed from the predetermined rotating speed, wherein the reference voltage is changed so that the pulse width of the index signal corresponds to a predetermined rotating angle of the motor.

2. A flexible disk drive device according to claim 1, wherein the index signal producing circuit exclusive of the capacitor, the reference voltage generating circuit, and the reference voltage switching circuit are formed into an IC form;
    said plurality of resistors include first, second and third resistors connected in series in the named order between the voltage source line and the second line; and
    the reference voltage is a voltage appearing between a node joining the first and second resistors and the second line, and a node joining the second and third resistors is connected to said reference voltage switching circuit.

3. A flexible disk drive device, comprising:
    a motor drive control circuit which detects a rotating condition of a motor and controls the motor to drive at a predetermined rotating speed; and
    an index signal generating circuit which receives a reference signal from the motor drive control circuit representing a reference rotary position in response to the rotation of the motor, initiates outputting of an index signal in response to the reference signal, terminates the outputting of the index signal in response to a comparison result of a terminal voltage of a capacitor with a predetermined reference voltage and sets the termination timing of the outputting of the index signal in response to a predetermined rotating speed of the motor by adjusting the charge or discharge time constant of the capacitor, said index signal generating circuit including a voltage divider circuit which is constituted by a plurality of resistors and which generates the predetermined reference voltage at a node between adjacent resistors, a speed selection signal generating circuit which generates a rotating speed selection signal commanding a different rotating speed from the predetermined rotating speed responsive to an operator-initiated signal, and a reference voltage switching circuit which changes the reference voltage to a voltage determining the termination timing of the index signal corresponding to the different rotating speed by changing a potential of a different node of said divider circuit in response to the rotating speed selection signal.

4. A flexible disk drive device according to claim 3 wherein the speed selection signal generating circuit generates the selection signal for one of a plurality of predetermined rotating speeds; and the flexible disk drive device further comprises:

an adjusting circuit for adjusting the time constant; wherein said index signal generating circuit is formed as an IC, said adjusting circuit and said capacitor are arranged as an external circuit with respect to the index signal generating circuit, and said motor drive control circuit controls the motor to rotate at a rotating speed represented by the rotating speed selection signal upon receipt of the rotating speed selection signal.

5. A flexible disk drive device according to claim 4, wherein said adjusting circuit is a charging circuit for charging said capacitor via a variable resistor which is operator-adjusted, and wherein said index signal generating circuit includes a discharge circuit for discharging said capacitor, and a comparing circuit which compares the voltage of said capacitor and the reference voltage and generates a detection signal when the voltage of said capacitor exceeds the reference voltage, initiates charging of said capacitor upon receipt of the reference signal, terminates the outputting of the index signal upon receipt of the detection signal and discharges said capacitor via said discharge circuit.

6. A flexible disk drive device according to claim 5, wherein said voltage divider circuit includes a series circuit of first, second and third resistors connected in the named order between a first potential line and a second potential line lower than the first potential line, the reference voltage is generated at a node joining the first and second resistors, and a node joining the second and third resistors is connected to said reference voltage switching circuit.

7. A flexible disk drive device according to claim 6, further comprising:

a constant voltage circuit disposed between the second potential line and ground, wherein the first potential line is the power source line, and said reference voltage switching circuit includes a switching circuit that renders a connection between the node joining the second and third resistors and ground in one of a conductive state and an interrupted state in response to the rotating speed selection signal.

8. A flexible disk drive device according to claim 7, wherein said speed selection signal generating circuit includes a switch, and the rotating speed selection signal selectively assumes either a first condition or a second condition depending upon the "ON/OFF" status of said switch, wherein upon receipt of the first condition of the rotating speed selection signal the connection between the node joining the second and third resistors and ground is rendered interrupted, and upon receipt of the second condition of the rotating speed selection signal the connection between the node joining the second and third resistors and ground is rendered conductive, wherein the resistance value of said variable resistor is such that the pulse width of the index signal corresponds to a first rotating speed generated under the interrupted condition, and wherein the resistance ratios of the first, second and third resistors are such that the pulse width of the index signal corresponds to a second rotating speed generated under the conductive condition.

9. A flexible disk drive device including a circuit which generates a variable speed selection signal based on first and second conditions established by an operator, a drive control circuit which drives a motor at a first rotating speed when the speed selection signal is in the first condition and drives the motor at a second rotating speed when the speed selection signal is in the second condition, a capacitor, an adjusting circuit which adjusts the charge or discharge time constant of said capacitor depending upon the condition set by the operator, and an index signal producing circuit which selectively generates an index signal having a pulse width corresponding to one of the first and second rotating speeds upon receipt of the terminal voltage of said capacitor whose time constant is adjusted by said adjusting circuit, further comprising, a voltage divider circuit having a plurality of resistors connected in series between a first potential line and a second potential line lower than the first potential line;

a pulse generating circuit which generates a reference pulse corresponding to a reference rotary position in association with the rotation of the motor; wherein said index signal producing circuit outputs the index signal in response to the reference pulse, compares the potential appearing at a first node of the resistors in said voltage divider circuit with the terminal potential of said capacitor which is selected dependent upon the adjustment of said adjusting circuit and terminates the outputting of the index signal having a pulse width corresponding to the first rotating speed in response to the comparison result; and a potential varying circuit which varies a potential at a second node of the resistors in said voltage divider circuit upon receipt of the second condition of the speed selection signal so that the potential at the first node is rendered to a potential which terminates the outputting of the index signal having a pulse width corresponding to the second rotating speed.

* * * * *